(12) United States Patent
Kupnik et al.

(10) Patent No.: US 7,093,502 B2
(45) Date of Patent: Aug. 22, 2006

(54) ULTRASONIC GAS FLOWMETER AS WELL AS DEVICE TO MEASURE EXHAUST FLOWS OF INTERNAL COMBUSTION ENGINES AND METHOD TO DETERMINE FLOW OF GASES

(75) Inventors: Mario Kupnik, Leoben (AT); Andreas Schröder, Vienna (AT); Michael Wiesinger, Graz (AT); Klaus-Christoph Harms, Graz (AT)

(73) Assignee: AVL List GmbH, Graz (AT)

( * ) Notice: Subject to any disclaimer, the term of this patent is extended or adjusted under 35 U.S.C. 154(b) by 152 days.

(21) Appl. No.: 10/892,476

(22) Filed: Jul. 16, 2004

(65) Prior Publication Data
US 2005/0066744 A1 Mar. 31, 2005

(30) Foreign Application Priority Data
Jul. 16, 2003 (AT) ............................. GM507/2003

(51) Int. Cl.
*G01F 1/66* (2006.01)
(52) U.S. Cl. ................................. 73/861.29; 73/861.27
(58) Field of Classification Search . 73/861.27–861.29
See application file for complete search history.

(56) References Cited

U.S. PATENT DOCUMENTS 6,854,338 B1 * 2/2005 Khuri-Yakub et al. ... 73/861.27

6,958,255 B1 * 10/2005 Khuri-Yakub et al. ........ 438/48

FOREIGN PATENT DOCUMENTS

WO 0003205 1/2000

\* cited by examiner

*Primary Examiner*—Harshad Patel
(74) *Attorney, Agent, or Firm*—Dykema Gossett PLLC

(57) ABSTRACT

An ultrasonic gas flowmeter includes a measuring pipe with flowing gas, transmitting and receiving sound transducers, transmission and reception electronics, and evaluation electronics. The sound transducers (7, 8, 9, 10) are designed as capacitive electro-acoustic ultrasonic transducers to construct a flowmeter with improved capacity, especially in view of temperature stability and the reduction and consideration of a temperature profile. Devices (5, 6) are provided to level the gas temperature profile and to minimize the influence of the temperature profile on the flow measurement. A more accurate and dependable detection of the volume flow or the mass flow of gases is to be achieved, especially in highly dynamic flows, for the method of determining the flow of gases whereby the mean flow velocity is determined and the flowing gas quantity is determined with highly synchronized resolution from the two transit times of two acoustic signals. In addition, an assessed value is computed (35) for the flow after the determination of the transit times and the assessed value is corrected at least by means of a characteristic temperature of the gas and the temperature of the wall of the measuring pipe (36).

46 Claims, 6 Drawing Sheets

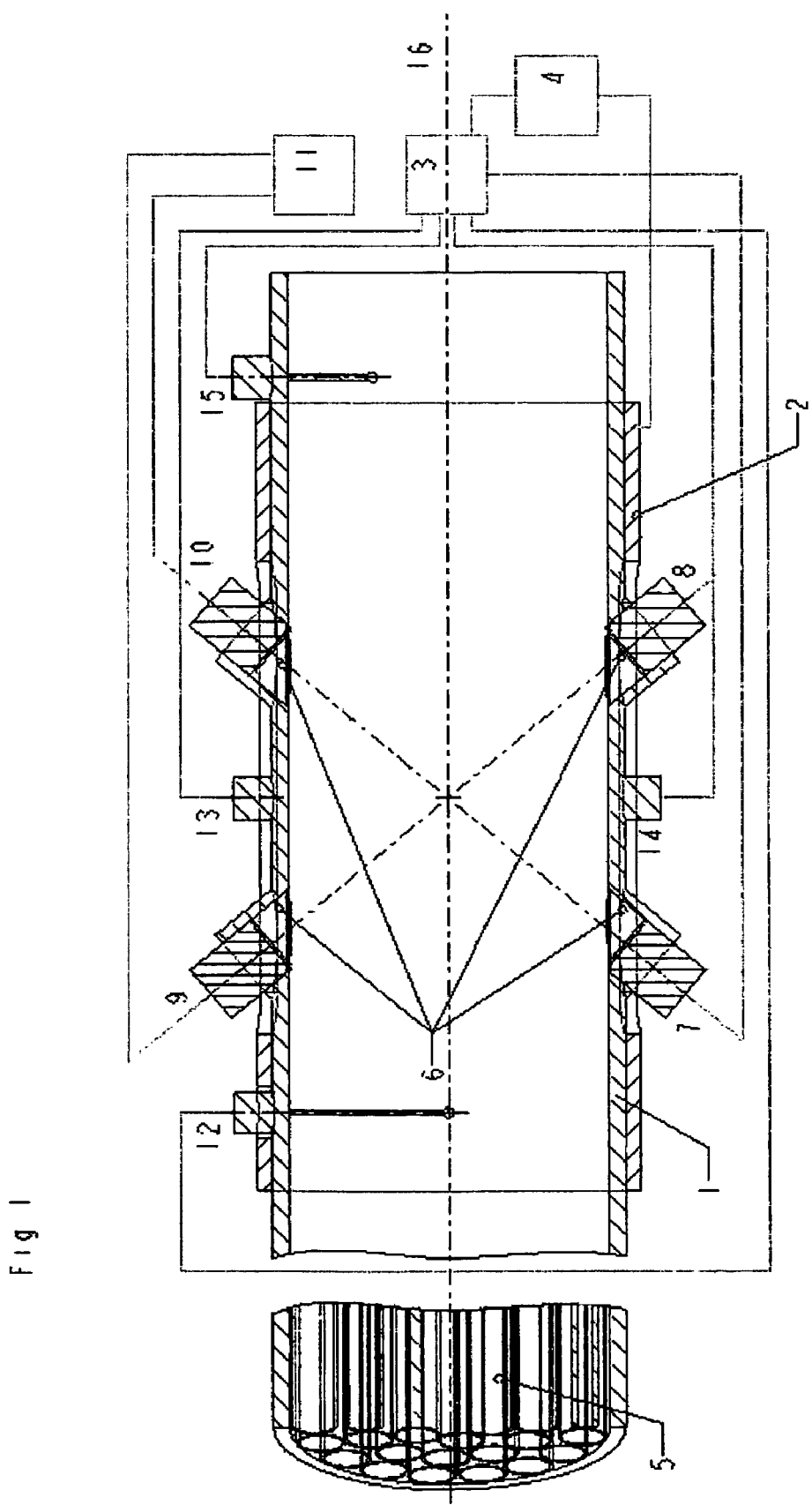

ULTRASONIC GAS FLOWMETER AS WELL AS DEVICE TO MEASURE EXHAUST FLOWS OF INTERNAL COMBUSTION ENGINES AND METHOD TO DETERMINE FLOW OF GASES

BACKGROUND OF THE INVENTION

1. Field of the Invention

The invention relates to an ultrasonic gas flowmeter including at least one transmitting sound transducer, one receiving sound transducer, transmission and reception electronics, and a device to measure exhaust flows of internal combustion engines, as well as a method to determine the flow of gases whereby the mean flow velocity is determined and whereby the flowing quantity of gas is also determined with a highly synchronized resolution from the transit time of the acoustic signals between transmitter and receiver.

2. The Prior Art

Such ultrasonic flowmeters are known for fluids and gases and they are the subject of various publications and professional articles. They use the so-called dragging effect, namely in that the velocity in the direction of the beam of acoustic signals in fluids is not only determined by the orientation of the acoustic transmitter and the sound velocity of the (static) medium, but these acoustic signals are dependent, among other things, on the flow velocity of the fluid medium. At least two transit times along at least two measurement paths are measured whereby at least one path must be oriented parallel or at an angle to the flow direction, upstream or downstream. The course of transit relative to one or other measuring paths can be transverse, shifted parallel or converging parallel as well.

The at least two transit times of the transmitted sound characteristics in the region of the flowing medium are determined from two measured time differences between transmitting time and receiving time. A mean flow velocity can be determined from the transit times, which results in the searched volume flow data with the aid of the known diameter of the pipe with the flowing medium.

The mass flow of the flowing gas can be calculated from the volume flow if the density of the gas is known. However, this is generally not known, especially in case of a pulsating gas flow and overlaying pressure pulsations and high temperature fluctuations. It is now a possibility to determine also the effective propagation velocity of the sound from at least two transit times of the sound, which is approximately the sound velocity of the static gas, and at the same time to measure the actual gas pressure and possibly also the actual gas temperature—simultaneously to the measuring of transit times—and to take these values into consideration in the evaluation.

However, this known method has currently limited applications. Based on the known equations for the ideal gas there is additionally necessary, as a result of an accurate determination of the gas mass-flow, either the knowledge of the adiabatic coefficient of the gas—that is the ratio of the specific heat capacity at constant pressure at constant volume—or the knowledge of the molar mass. However, these values are not always known and they are not constant over time in case of an exhaust gas from a variably occurring combustion.

The values of the mean flow velocity and the sound velocity are obtained from the transit times and the course of the flow in the volume, which passes the sound paths. They respectively represent a determined value of the sound path and the transit time, while the determined flow velocity relative to the diameter of the pipe is of importance in the determination of the flowing gas quantity. Since these two pieces of information do not give generally the same results, complicated systems were envisioned to minimize the influence of the flow profile on the sound paths and on the values of flow and sound velocity, which are determined from the transit times. For example, it was proposed to position several ultrasonic transducers in such a manner that the flow velocity determined from the transit times corresponds to the velocity determined from the diameter of the pipe. In addition, special sound paths in the vicinity of the pipe wall were proposed, especially for large pipe diameters. Through a suitable but costly arrangement and evaluation, it was to be ensured that the flow velocity, determined from the transit times, corresponds to the velocity detected relative to the pipe diameter.

It is further known that an error correction can be performed in the form of a calibration constant to consider the flow profile existing in the medium, which is sensible, nevertheless, only in case of a time-constant flow characteristic but not in case of a non-stationary and pulsating flow.

One disadvantage of the known device and method is especially the fact that they are often and wrongly based on a linear course of the sound path in the pipe with flowing medium.

In fact, the azimuthal flows in the measuring pipe have a well-known large influence on the respective sound path and thereby and influence on the measurement results of an ultrasonic gas flowmeter. Flow-shaping devices are suggested to be installed inside the measuring pipe as a remedy against such rotational velocities, i.e. flow rectifiers or stream-lining devices in the form of lamellas or thin tubing.

However, it is generally not taken into consideration that sound breaks occur based on an axial flow profile besides the altering drift of the sound. Starting from zero at the ultrasonic transducer diaphragm and near the pocket of the transducer, which is mounted to the measuring pipe at an angle, the flow velocity is even or smooth up to the maximum velocity at about the center of the pipe. A deviation of the local sound impedance occurs dependent on the local sound velocity relative to the flow velocity whose gradient causes the breaking of sound.

The additional breaking as a result of a temperature profile in the flowing gas, which is also not considered in prior art, is of special significance. Especially at a temperature difference between the measuring pipe and the medium there can be a sound path largely deviating from the linear propagation.

It may occur in an extreme case that the sound emitted by the aligned transmitter and receiver is made to drift or is broken to such a high degree that it does not reach the receiver at all and a measurement of the transit time is no longer possible thereby. A circumstance like this can be observed, for example, in the measurement of the quantity of exhaust gas in an internal combustion engine. At sudden load changes from idling to full load, there might occur high flow velocity and temperature differences of 300° C. between the flowing exhaust gas and the pipe, for example, which can lead to the formation of extreme flow and temperature profiles and to the deflection of the sound from the linear propagation, depending on the pipe dimension of up to a few centimeters.

Drifting and breaking of the sound in the non-stationary gas flow, which has a non-stationary temperature profile, are also the cause that now only one part of the maximal detectable amplitude, dependent on the temporarily existing flow characteristic, reaches the receiver and is measured thereby. In addition, the transmission of sound can be extremely distorted and damped based on the local vorticity and pressure fluctuations up to cavitation effects. These highly fluctuating interruptions lead to a strong influence on the amplitude and signal form of the two reception signals, which results in placing high demands on the evaluation method, the ultrasonic transducer, and on the entire arrangement. Based on these effects, the usable measuring range of the flowmeter is clearly limited and the evaluation of data is made more difficult. Furthermore, the employment of the flowmeter on an engine test bench represents a difficult surrounding for the sensor electronics relative to the electromagnetic compatibility (EMV). Traditional systems and evaluation methods, e.g. cross-correlation with a stored reference signal (EP 0 797 105 A2), or methods using threshold sampling (DE 196 36 945 A1), cannot satisfy all these commands.

The flow velocity to be measured in the exhaust pipe may include a wide range of values, mainly when the usual standard diameters are used for the measuring pipe, independent from the size of the engine. There are in fact proposals relative to maximizing the measuring range proposing a special mechanical alignment of the transducer with a specific correction angle (K. S. Mylvaganam, "High-Rangeability Ultrasonic Gas Flowmeter for Monitoring Flare Gas," IEEE Transactions on Ultrasonics, Ferroelectrics and Frequency Control, vol. 36, pp. 144–149, 1989.) However, this requires higher manufacturing costs for the measuring pipe and does not make possible constant adaptation to different flow velocities and different temperature profiles.

The exhaust gas temperatures can be from −40° C. to approximately 1,000° C., depending on the operational condition of the internal combustion engine and the position of the flowmeters in the exhaust train (e.g. at a cold start of the engine in the environmental chamber.) Current devices (i.e. from Sick AG) are highly limited relative to the maximal admissible exhaust gas temperature (200° C.) because of the use of piezo-ceramic ultrasonic transducers.

Deciding is also the fact that the exhaust gas temperature of an internal combustion engine can change rapidly and to a high degree, e.g., at a load change in engine operation at full load during pulling operation. Based on this large and rapid change of the flow characteristics, there may also occur unpredictable reflections and overlaying of the actual reception signal together with parasitic sound signals, which would lead to false results during the use of traditional evaluation methods.

Known ultrasonic gas flowmeters have the difficulties to detect sufficiently accurate the pulsations of pressure and flow velocities existing in the exhaust gas flow to a high extent. Based on the scanning theorem, there is namely the requirement for the avoidance of measurement artifacts (aliasing) to scan the signal at such a high frequency that the scanning frequency is at least twice as high as the frequency of the signal component existing in the signal that has the highest frequency. An exhaust gas quantity sensor must therefore have also a correspondingly high measurement repetition rate. One has to assume for automobile engines, for example, a repetition frequency rate of at least 3 kHz, depending on the position of the mass flow sensor in the exhaust train. Commercially available devices (e.g. Sick AG) operate with a measurement repetition frequency of maximal 30 Hz.

Based on the condition existing in the exhaust pipe, the evaluation method used in the exhaust gas quantity sensor should have an adequate possibility for plausibility controls of the detected flow values.

The employment of capacitive ultrasonic transducers represents a basic improvement for ultrasonic flowmeter for gases as it was already proposed in general (I. J. O'Sullivan and W. M. D. Wright, "Ultrasonic measurement of gas flow using electrostatic transducers," *Elsevier Ultrasonics*, vol. 40, pp. 407–411, 2002.) It is not known, however, how the number of the aforementioned problems can be solved. In particular, there were not disclosed any suitable evaluation methods, transducers and arrangements for the employment in the exhaust train of an internal combustion engine.

A general difficulty with ultrasonic transmission and reception transducers for gases is to send sufficient acoustic energy into the medium and to be able to obtain a sufficiently strong electric reception signal from the received acoustic energy. Up to now, piezoelectric ultrasonic transducers were practically exclusively employed as transducers that are distinguished by a compact structure made of a solid-state material. The large difference in the acoustic-wave resistance between the gas medium, on the one hand, and the material of the sound transducer, on the other hand, has a disruptive effect since solid-state materials have a specific wave resistance that is 100,000-fold higher than the one of gases. This means that most of the acoustic energy is reflected from the bordering surface of the transducer to the gas medium and only a small portion is transmitted. These transducers have therefore an extremely low sensitivity in high frequency ranges for transmission or for reception as well.

The same characteristic has the result that the piezoelectric sound transducer can easily described as solid-state acoustic resonators with a characteristic natural frequency and having a relatively high oscillating quality or having a narrow-band frequency characteristic. This fact is intentionally exploited to obtain a sufficiently high sensitivity: In the range of its natural frequency or its resonance frequency there is an acceptable high sensitivity based namely on the resonant rise, even though the sensitivity drops to essentially unusable low values outside this narrow-band frequency range. Of course, there is related to the frequency characteristic of the high-quality resonator also a long-term build-up and decay behavior of the transducer, which causes difficulties again with the accurate transit time measurement and which leads thus to inaccuracies and a low sampling rate during flow measurement.

Various attempts have been disclosed to improve the situation. It has been tried to damp the back echo in the piezoelectric transducer through sound-absorbing layers, so-called "backing layers" to increase the bandwidth to some degree in this manner—this was accomplished, however, in exchange for a loss in sensitivity. Layers were arranged on the front of the transducer for so-called impedance matching to the wave resistance of the gas medium, however, with little success. The transducer element itself was made also of a composite wherein piezoelectric rods are embedded in a plastic polymer matrix so that the wave resistance of this element of composite is lowered and "clean" vibration modes are achieved at the same time. Signal-analytical methods were developed to achieve accurate transit-time measurements in spite of the occurrences of build-up and decay. Even with all these efforts, the efficiency of ultrasonic flow measurement remained limited mainly because of the narrow band of the employed transducer, especially the piezoelectric ultrasonic transducer.

An additional disadvantage of these transducers exists in their limited temperature stability. Its metallic coated diaphragm stretched over an electrically conductive substrate forms at the same time the insulation layer of the electric capacitor whereby the plastic foils or silicone nitride usually used as dielectric diaphragm material are not sufficient for the temperature requirements for the quantity measurement of the exhaust gas (D. A. Hutchins, D. W. Schindel, A. G. Bashford, and W. M. D. Wright, "Advances in ultrasonic electrostatic transduction," *ElsevierUltrasonics*, vol. 36, 1998.) Even the so-called electret transducers, which have a permanently polarized dielectric diaphragm, do not have sufficient temperature stability, i.e. a Teflon-type polymer diaphragm with inserted electric charge carriers (electrons).

A particular disadvantage with traditional ultrasonic flowmeters with oblique irradiation by ultrasonic waves is the angled position of the transducer to the pipe wall, which is required in traditional transducers. The thereby developing recesses or pockets cause an advanced transit time of the ultrasonic wave that would have to be considered in the evaluation of the transit times. In addition, flow vortexes are induced in the recesses and in the flow that can cause falsification of the measured values. The vortexes additionally increase the problem of the deposit of particles transported along with the flow. Particles deposited on the transducer diaphragm can greatly change the transmission characteristics of the transducers. The disclosed proposal for a remedy could not sufficiently solve the problem, for instance, a screen stretched over a recess that is to be permeable for the ultrasound but impermeable for the flow—or the aeration of the recess with clean air.

The use of capacitive ultrasonic transducers does not only offer advantages. Improvements in circuitry would be desirable relative to the polarization voltage, which has a considerable co-effect on the electrical and mechanical operational center of the transducer. The required polarization voltage of 100 to 200 volts, for example, is usually established for the transducer capacity via a high-ohmic electric resistor. The resulting electrostatic force causes, on the one hand, the flat placement of the diaphragm onto the textured back plate and, on the other hand, a linear transducer characteristic, which means, a transducer sensitivity that is almost independent from the amplitude of the electric transmission signal or the acoustic reception signal. However, the polarization voltage prevents also the simple use of circuitry concepts common in piezo-ceramic transducers or electret transducers, namely the electrometer and charge amplifiers that relate directly to the mass potential.

The charge amplifier and the electrometer amplifier would both be advantageous and nearly of the same value as reception amplifier relative to the achievable SNR (signal-to-noise ratio); however, in contrast to the electrometer circuit, the charge amplifier makes a greater bandwidth possible, which can be advantageously used especially in high-frequency applications such as optical data transmission with photo diodes or with ultrasound. The large bandwidth is the result of the fact that the parasitic capacity of the transducer and of the connecting cable does not have to be recharged with the signal voltage in case of the charge amplifier concept. The operational amplifier creates in fact zero voltage at its inverting input so that the voltage in the transducers and in the existing parasitic components remains exceedingly small to the point of disappearance.

However, a charge amplifier in the traditional form is not possible because of the electric polarization voltage necessary in capacitive ultrasonic transducers. The electrically pre-charged transducer has been coupled up to now to the charge amplifier acting against the mass potential via a voltage-proof coupling capacitor. A "pure" charge amplifier operation of the capacitive ultrasonic transducer is no longer possible with all its advantages. The transducer lies no longer directly at the virtual zero-point of the operational amplifier, which reduces the bandwidth that can be achieved. A very large coupling capacitor would put too much load on the transducer—but with small transducers, the total sensitivity of the transducer plus the amplifier or their group transit time would not be defined enough based on the manufacturing-related fluctuations of the transducer capacity. In case of the ultrasonic flow measurements by means of transit time detections at two reception channels, two respective amplifiers would have to be calibrated in the rule since any asymmetry would lead directly to a time error based on the group transit times, which must be considered to be extremely problematic. The same applies to the connecting cable since achieving of complete symmetry of the two connecting cables is difficult and costly in a final configuration of the apparatus.

As a conceivable alternative thereto, one would have to mention also the electric impedance conversion occurring directly on the transducer in the housing. However, this is to be discounted because of the lack of space and in view of the high temperatures of the exhaust gases to be measured.

The aforementioned disadvantages of the state-of-the-art are of special significance in the measurement of exhaust gas flows of internal combustion engines and they can prevent the realization of advantageous devices in the measuring technology having gas flowmeters in the exhaust gas system (see for example WO 02/42730 A2 of PCT/AT01/00371), particularly in hot and strongly pulsating regions. With the available gas flowmeters there can be performed, nevertheless, some applications in the automotive measuring technology such as, for example, the measuring of blow-by gases (leaking gas from the crankcase.) However, the possible applications are very limited, especially in the exhaust gas analysis on the engine and drive-train test bench as well as on the roller-type dynamometer for vehicles, or in vehicles on the road.

It is the object of the present invention to overcome the aforementioned difficulties and to provide an ultrasonic gas flowmeter having considerably improved capacities, particularly in view of temperature stability and the reduction and consideration of an existing temperature profile.

An additional object of the invention is an improvement of the evaluation method for more accurate and dependable detection of the volume flow or the mass flow of gases, especially highly dynamic flows.

SUMMARY OF THE INVENTION

This object is achieved according to the invention in that the sound transducers are designed as capacitive ultrasonic transducers for the generation of sound as well as for the reception of time transient sound signals, and devices to level the gas temperature profile of the flow, and to minimize the influence of the temperature profile on the flow measurement.

For example, a metal diaphragm made of titanium is employed in place of the highly elastic insulating diaphragm foil having mostly a metallic coating on one side, which is otherwise commonly used.

However, the through-going electric conductivity of the diaphragm material makes the construction of the capacitive transducer more difficult. Instead of simply providing the commonly used electrically conductive material for the second electrode of the capacitor, which forms the transducer, it is necessary to make special provisions for an insulating layer. An electrode or a back plate having an insulating layer can serve for this purpose, which advantageously consists of a doped semiconductor and an insulating layer superimposed thereon, which is usually applied and onto which the diaphragm is placed directly.

Care must be taken so that the insulating layer corresponds to the base material of the back plate (doped semiconductor) relative to its thermal expansion factor. It is therefore especially advantageous if the insulating layer is made of material that has been created through a reaction of the material of the second electrode or back plate under the influence of heat with the ambient atmosphere during the manufacturing process. For example, a base material of highly doped silicone can be treated in a furnace in an oxygen atmosphere at approximately 1,000° C. for about 24 hours. A silicone oxide layer of approximately 1.5 micrometers is created thereby that satisfies the required insulation demands. Layers "grown out" of the material in such a manner have a considerably higher thermal and mechanical capacity compared to the layers applied by means of sputtering or chemical vapor deposition (CVD) technology.

The frequency behavior, which means, the sensitivity of the high-temperature ultrasonic transducers constructed in this manner, can be influence by means of resonance volumes developing between the insulating layer and the diaphragm lying directly thereon. In addition, the second electrode or back plate is provided with a texture whereby trapped air, caused by the natural roughness of the surface, can additionally influence said frequency behavior.

According to another embodiment, the second electrode or back plate is provided with a texture made of discrete artificial texture elements, preferably an etched texture. Shown to be especially advantageous were line-shaped or honeycomb-shaped texture elements with a characterizing width of 80 to 120 micrometers for an interesting frequency range of 100 to 600 kHz. There is furthermore a direct relationship between the depth of the texture and the sensitivity of the ultrasonic transducer. Especially good results were achieved for the required application with texture depths of approximately 0.4 micrometers. It is to be mentioned that the texture can be produced before the creation of the insulating layer on the unfinished back plate as well as after the creation of the insulating layer. That means, in the doped semiconductor as well as in the insulating layer. Since texturing after creation of the insulation is preferred in this case, a larger space is created between the charged electrodes disposed between the non-textured areas (connecting elements) of the back plate and the diaphragm, and the static capacity of the transducer is thereby lower then if the insulation layer is created after the texturing. According to the invention, the production of a relatively low texture is performed by means of a chemical etching process using traditional methods of lithography. That is, the entire back plate is at first coated by means of light-sensitive lacquer (mostly with the aid of a spinner) and it is then exposed with the aid of an exposure mask according to the processing instruction of the manufacturer. Depending on the lacquer, the exposed or the non-exposed surfaces of the lacquer are opened through development of the lacquer in the developing bath. The texture patterns can then be deep-etched at the opened surfaces. The etching depth can be determined thereby through the etching period.

The transducer is advantageously provided with a plurality of separately accessible or readable areas in a linear or a plane arrangement. This make the avoidance of pocket holes possible relative to the transducer reception, which could cause additional turbulence of the flow in the region of the ultrasound path. These so-called "array transducers" are preferably manufactured by means of the aforementioned technologies. They have the advantage to make possible the characteristic of being oriented at an angle relative to the face of the transducer for the transmission or reception of sound. Flush-mounted installation of the ultrasonic transducer in the measuring pipe is thereby possible even at oblique irradiation by ultrasonic waves in the pipe. Individual areas of the array transducer are selected with the electric transmission signal at periodic discrete intervals in the use as transmitter. In the use as receiver, the individual reception signals are evaluated at a delayed time. In both types of operation, the angle characteristic of the transducer can be influenced by the variation of the periodic intervals, and the acoustic drift as well as the acoustic breaking phenomenon can be advantageously counter-acted thereby.

The construction of a transducer of this type is similar to the above-described manner: A uniform pattern of electrodes made of platinum, for example, is placed on an insulating, high-temperature stable material (substrate), i.e., aluminum oxide ($AL_2O_3$)or sapphire by means of sputtering or vapor deposition. A strip-shaped pattern with strips of a width of 1 mm is applied to the substrate at a distance from one another of 0.5 mm, for example, for a plane and angled transmission and reception characteristic in a frequency range of approximately 100–600 kHz. In a second step, an insulating layer is placed on the surface in such a manner that a separate selection of the individual strips of electrodes is made possible by means of contact. The insulation layer is then textured by means of the lithography and etching technology described above. The metallic diaphragm lies then against this texture whereby said diaphragm is held in place by the transducer housing as in traditional capacitive ultrasonic transducers. The effects of acoustic breaking and drifting through the temperature or flow profile can be counter-acted by means of an adjustable radiation angle realized by a transducer of this type.

Another possibility to act against the aforementioned effects is to make the distance between the transmitter and the receiver adjustable in the direction of flow. This can be achieved according to the embodiment of the invention in that at least one sound transducer, preferably the reception transducer(s) is/are movably mounted. At a flow velocity of 30 m/s, which results in a drift of approximately 10 mm downstream at a pipe diameter of 50 mm, for example, the reception transducer can be moved exactly by this distance to ensure the same transmission behavior as without any flow.

A rotatable mount of one or several transducers achieves successfully in a similar manner that a corresponding correction angle can be provided in the acoustic radiation so that the acoustic beam of the transmitter hits directly the receiver surface with its maximal sound level even at a high flow velocity or at a high temperature difference between the pipe wall and the flowing gas. In addition, the transducer is movably mounted in such a manner that the incoming and outgoing angle of the acoustic beam relative to the pipe axis can be changed by rotating the transducer.

Furthermore, a high temperature difference between the pipe wall and the flowing gas is decreased or avoided by means of a heating device for the wall of the measuring pipe, possibly also for the sound transducer. It is proposed thereby to match, as much as possible, the pipe temperature to the actual temperature of the flowing gas.

It is especially recommended to manufacture the measuring pipe of a material that has a low specific heat capacity, especially made of thermally insulating material, and/or to provide it with a coating of such material and/or to enclose it with a casing of such material. In the ideal case, this leads to the fact that the temperature of the pipe wall at the side of the measured gas always follows automatically the temperature of the gas itself—this can be achieved with only a small heating effort or none at all.

It is additionally advantageous for transient processes of long duration, as they occur with exhaust gases of internal combustion engines during a change in load, to install or integrate temperature- and/or flow profile-forming devices in the measuring pipe. These devices cause leveling of the temperature profile as well as of the flow profile. According to the invention, there are screens and sections of tubing bundles proposed, as they are used otherwise to cause a laminar flow, to ensure, on the one hand, uniform mixing of the generally turbulent flow as much as possible to obtain a uniform gas temperature thereby, and to obtain a uniform and irrotational flow profile, on the other hand. Furthermore, heatable screens are provided on the measuring pipe, which do not obstruct sound radiation, and they close the pocket holes and are flush-mounted in the continuation of the pipe wall.

Aside from the purely mechanical measures to minimize the temperature profile of the flowing gas, it has been shown to be especially advantageous to add computed corrections to the results of the flow measurement depending on additional physical parameters. It can be shown in this manner that the change of the sound path caused by the temperature profile can be taken into consideration by means of an additional correction factor in the evaluation of the flow and sound velocity computation. It has been shown to be especially advantageous thereby to change this correction factor depending on the temperature of the pipe and the characteristic temperature of the gas. According to the invention, a temperature sensor is provided to measure the temperature of the wall of the measuring pipe whereby said sensor is connected to the evaluation electronics.

In an additional embodiment of the inventive device, an additional temperature sensor is provided to measure the temperature of the flow whereby said sensor is connected to the evaluation electronics.

In addition, there is shown a not to be discounted dependence of the measurement results of the gas flowmeter relative to the composition of the gas, especially if the mass flow has to be generated for a measurement result or if data has to be created about the volume flow while standardized to a specific temperature. A device to determine the gas composition is therefore provided according to the invention, particularly a lambda probe, to detect the so-called air ratio $\lambda$. It has been shown to be especially advantageous, particularly in the measurement of the exhaust gas mass-flow on test benches, to determine the gas composition by means of a lambda probe whereby said composition relates parametric to the air ratio $\lambda$.

Consideration of the gas composition can be taken thereby directly during the evaluation of the flow (which means, independent from the actual flowmeter) or in the evaluation electronics of the flowmeter itself as proposed in the invention. A respective data line and data interface is provided through which the information about the gas composition is forwarded.

Primary signals of a large signal-to-noise ratio, being undistorted as much as possible, are necessary for a correct and highly dynamic evaluation of the flow by means of ultrasound. The capacitive transducer and the analog primary processing of the signals are used for this purpose. The reception electronics are designed as an analog amplifier, according to the invention, and the reference potential or a least the primary amplifier stage is elevated to the potential level of the transducer, which means, to the bias voltage. To avoid the above-mentioned problems relative to the asymmetry and bandwidth in the amplifier circuit of the traditional type for capacitive ultrasonic transducers, the reception electronics are designed as an analog amplifier, according to the invention, and the reference potential of at least the primary amplifier stage is elevated to the potential level of the transducer, which means, to the bias voltage. Traditionally-used coupling capacitors can thereby be avoided, which would considerably lower the transmission bandwidth of the transducer amplifier for signal detection and it would capacitively stress the ultrasonic transducer. The coupling capacitor represents thereby a capacitive load lying parallel to the transducer at the input of the amplifier circuit under consideration of the virtual zero-point.

In another especially advantageous embodiment, the inverting input of the amplifier circuit is connected directly to the capacitive transducer.

For the protection of the amplifier in case of a disruptive charge, it can be advantageous in the above-mentioned embodiment that the capacitive transducer and the reference potential is connected to the inverting input of the amplifier circuit via a capacitor, but which does not function as a traditional coupling capacitor in this embodiment, but functions purely as protection since there is the same voltage at both side of this capacity, namely the bias voltage. The amount of the capacity can be chosen to be very large in this case, e.g. 100 nF, since the transducer is biased in this case by a capacity through the series connection and the internal resistance of the bias voltage source. However, the internal resistance is only to such a degree in standard operation that the load of the transducer can be nearly disregarded.

The capacity of the capacitive ultrasonic transducer represents an RC element (resistance capacitance) together with the coupling resistance of the bias voltage and it is thereby a low-pass filter for interferences of the bias voltage. Since there is now the same voltage at the non-inverting input of the amplifier, namely the bias voltage (possibly separate from the transducer potential by means of the above described capacity), it is advantageous and it is proposed in the invention not to suppress interferences at the non-inverting input of the amplifier whereby the reference potential exists also at the non-inverting input of the amplifier circuit via an RC element.

It is advantageously proposed in a special embodiment that the time constant of said RC element is approximately equal to the time constant of the filter formed by the transducer capacity and the coupling resistor of the reference potential.

According to the invention, additional filters are connected on the load side to the primary amplifier circuit to suppress interfering signal components outside of the used frequency range of 300–400 kHz, for example, preferably a high-pass filter, possibly a second amplifier stage with a subsequent band-pass filter, and possibly at least one catcher capacitor. The de-coupling of the useful signal from the bias voltage by means of a voltage-stable coupling capacitor can be performed as desired in front, in, or also behind these connections.

According to the invention, a device to measure exhaust gas flows of internal combustion engines is characterized in that a gas flowmeter is installed in the exhaust train of the internal combustion engine according to one of the prior paragraphs. Accurate and highly dynamic measurements of the flow can be performed of the pulsating and the extremely hot exhaust gases during many operational conditions—be it stationary in test benches or workshops of also on-board of vehicles in normal operation. The employment directly in the exhaust manifold of a single cylinder is as conceivable as the installation in front or after the catalytic converter as well as between the mufflers and the end of the exhaust train.

According to an advantageous embodiment, the gas flowmeter is provided in the close vicinity of a possible location of a gas sampling point for the determination of pollutant components in the exhaust gas.

Of course, the gas flowmeter can be employed in pipe sections with partial flows of exhaust gas of the internal combustion engine if it is necessary for the measurement or if the location of installation is more suitable.

In the best case, all gas flows are to be monitored to be able to obtain the best possible overview of the internal combustion engine whereby it may be proposed that the gas flowmeter is employed in pipe sections which have a gas flow designed for the dilution of the exhaust gas of the internal combustion engine.

It is proposed to improve gas flow measuring with capacitive sound transducers not only as seen from the mechanical side but also to improve the aforementioned evaluation method in that an assessed value is calculated for the flow after the determination of acoustic transit times and said assessed value is then corrected at least by means of a characteristic temperature of the gas and the temperature in the pipe wall.

An assessed value is at first determined for the flow velocity v and for the sound velocity c under consideration of a constant $k_1$ corresponding to the flow profile, the transit time in direction of flow $t_+$, the transit time against the direction of flow $t_-$, as well as of two constants $k_2$ and $k_3$ corresponding to the pipe geometry:

$$v = k_1 k_2 \left( \frac{1}{t_+} - \frac{1}{t_-} \right) \quad (EQ\ 1)$$

$$c = k_3 \left( \frac{1}{t_+} + \frac{1}{t_-} \right) \quad (EQ\ 2)$$

A first assessed value for the volume flow V is obtained from the equation EQ 1 by multiplication with the diameter of the measuring pipe A:

$$\dot{V} = Av = A k_1 k_2 \left( \frac{1}{t_+} - \frac{1}{t_-} \right) \quad (EQ\ 3)$$

This assessed value is now corrected corresponding to the characteristic temperature $T_c$ as well as to the temperature of the pipe wall $T_w$ by means of function $f_1(T_c, T_w)$:

$$\tilde{V} = f_1(T_C, T_W)v = f_1(T_C, T_W) A k_1 k_2 \left( \frac{1}{t_+} - \frac{1}{t_-} \right) \quad (EQ\ 4)$$

Should a value for the actual mass flow be of interest, then this can be calculated from the equation EQ 4 by means of multiplication with a nominal density.

It is additionally proposed in a further improved embodiment of the method that the value of the actual pressure in the measuring pipe is used to determine this assessed value, preferably exactly at the location of the transit time measurement. Sudden density changes of the flowing medium can thereby be included in the computation. The actual density p is thus determined from the sound velocity c (EQ 2) that is computed by means the transit times, the ratio of the specific heat capacity κ and the actual pressure p:

$$\rho = \frac{\kappa p}{c^2} \quad (EQ\ 5)$$

In another special embodiment it is proposed that the assessed value is corrected relative to the temperature difference of the characteristic temperature of the gas and the temperature of the wall of the measuring pipe.

Shown to have been especially advantageous is a functional relationship of the function $f_1(T_c, T_w)$ of the form:

$$f_1(T_c, T_w) = k_4(T_c - T_w) \quad (EQ\ 6)$$

The value $k_4$ is thus a constant that is determined empirically or it is based on the theoretical assumption about the flow and temperature profile.

According to the invention, for the determination of the mentioned temperatures that measured are either the temperature of the pipe wall or the temperature of the gas in the measuring pipe—or even both temperatures. Traditional temperature sensors can be employed for this purpose.

However, the slow reaction times of temperature sensors are of disadvantage thereby, especially in measuring the gas temperature, which can in fact change at very short time intervals, for instance, within a few milliseconds. It is therefore proposed according to the invention that the characteristic temperature of the gas is determined from the transit time—and thereby from the assessed value for the sound velocity—with the aid of a physical model of the temperature profile of the measuring pipe.

It is further proposed according to the invention to state the characteristic temperature of the gas more precisely through consideration of the temperature of the wall of the measuring pipe.

The sound velocity c determined by means of the transit time measurement represents in fact a mean value of the location-dependent sound velocity č(r) (r ... pipe radius of a radial symmetrical pipe, R ... inner pipe radius) relative to the pipe diameter:

$$c = \frac{1}{2R} \int_{-R}^{R} \tilde{c}(r) dr \quad (EQ\ 7)$$

If one continues in respect to the ideal gas equation in the following illustrated form of the local sound velocity from:

$$\tilde{c}(r) = \frac{\kappa R}{M} \sqrt{T_C} \sqrt{f_2(r)} \quad (EQ\ 8)$$

whereby $f_2(r)$ implies the form of the temperature profile M, the molar mass of the gas, and R is the ideal gas constant, then a characteristic temperature of the gas can be determined from the equations EQ 7 and EQ 8.

Since the temperature changes in the gas occur very rapidly, as already mentioned, it is of advantage to perform the temperature measurement in such a manner that the measurement values of the temperature and the measurement values of the transit time are valid for the same volume. That can be achieved in that the geometry of the arrangement and the flow velocity are taken into consideration during the selection of times for the temperature measurement(s) and the transit time measurements.

In a special embodiment of the method, the computation of the assessed value of the flowing gas quantity considers the gas composition of the medium in such a way that a nominal value for the adiabatic coefficient κ—which means, the state of the specific heat capacity at constant pressure and volume—is used in the computation of the gas quantity.

It is further proposed to correct this nominal value correspondingly to the characteristic temperature of the gas, which means, the temperature-dependent adiabatic coefficient $κ(T_c)$, dependent on the composition of the gas, is inserted into the equation EQ 8 and EQ 5.

According to the invention it is proposed for consideration of parasitic reflection signals and thereby for precise detection of the ultrasound transit times that an expectation time window is determined relative to the transmission time and an assessed value for the transit time of the ultrasonic signals. A search is conducted then in said time window for the exact arrival time of the reception signal.

It is further proposed to adapt the sequence of the transmission times—which means, the measurement repetition rate—to the assessed transit time, whereby it can be achieved that probably no parasitic reflection signal lies before the actual useful signal in the time window of expectation.

In a simple way, the transit time of a prior measurement can be used as assessed value for the transit time according to a first method version.

Another version of the method being less complicated in the detection but having greater accuracy proposes that a computed value derived from a sample value corresponding to the results of a prior flow measurement can be used as assessed value.

In an additional advantageous embodiment of the method it is proposed that at first an estimated time for the start of the reception signal is set for the determination of the transit time and the precise start is set through analysis of the phase information of the reception signal represented as a complex value.

The Hilbert transformation of the real reception signal can be used for the determination of the reception signal of complex value.

In an especially advantageous embodiment of the evaluation method for the actual reception signal, the actual phase position of the complex representation of the reception signal is determined and the estimated time for the start of the reception signal is set at any desired time in the domain of a continuous change of the phase position.

The time of the appearance of the maximal amplitude can be used thereby advantageously for the estimated time of the start of the reception signal. The arrival time can be set with such a method with a least one uncertainty of half of a cycle duration of the transmission signal (±T/2).

It can be further proposed to increase precision in that the precise start of the reception signal is determined with the aid of a first noisy phase position based on the estimated time for the start of the reception signal.

The first zero passage of the reception signal is advantageously defined as the sound characteristic determining the arrival time.

The invention is illustrated in the following with the aid of some illustrations of preferred embodiments of the invention.

BRIEF DESCRIPTION OF THE DRAWINGS

FIG. 1 shows thereby schematically the construction of a gas flowmeter according to the invention.

DETAILED DESCRIPTION OF THE PREFERRED EMBODIMENTS

Figure 2A:
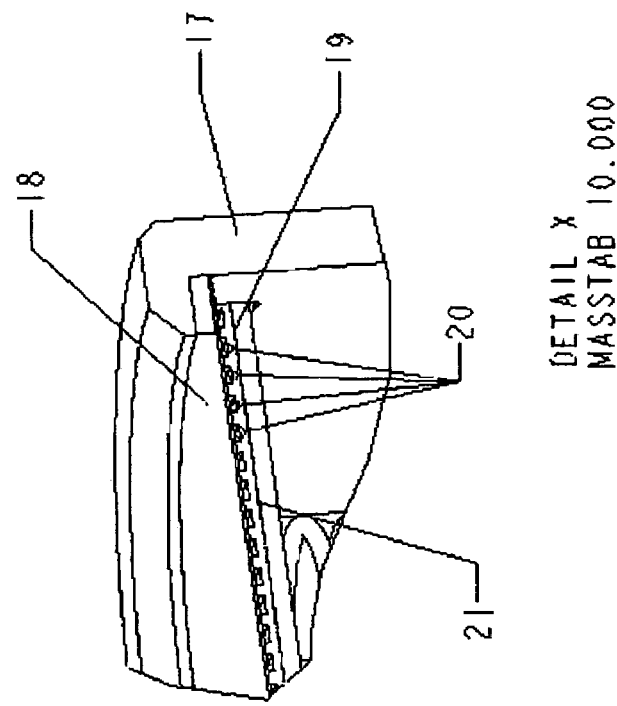
FIGS. 2 and 2A show a total view and a detail of a capacitive ultrasonic transducer according to the invention.

The longitudinal section of the inventive gas flowmeter arrangement of FIG. 1 shows the measuring pipe 1 through which the gas flows whose volume or mass it to be determined. The measuring pipe 1 is provided with a heating element 2 with which the temperature of the measuring pipe 1 can be increased and controlled via the evaluation electronics 3 while interconnected to heating control electronics 4. The measuring pipe is advantageously equipped with additional flow and temperature profile-forming baffles 5 in front of the location of the transit time measurement (relative to the direction of the main flow through the pipe.) These baffles 5 may be designed as guiding metal foils or bundles of tubing having a smaller diameter than the measuring pipe 1.

The transmission transducers 7 and 8 as well as the reception transducers 9 and 10 are inserted in the pockets or lateral cylindrical pieces of the measuring pipe, which can be closed off by the acoustically-transmissive full covers 6, i.e. screens or the like, being flush-mounted with the wall of the measuring pipe 1 whereby said transducers are designed as capacitive ultrasonic transducers. The capacitive transducers 7 through 10 and the covers 6 can be heated by the heating elements 2 of the wall of the measuring pipe 1 or by their own separate heating elements.

The ultrasonic transducers 7 through 10, preferably only the reception transducers 9 and 10, can be mounted in an insert that is movable in longitudinal direction of the measuring pipe 1 whereby the insert is adjustable via a spindle with a step motor. Displacement can be performed thereby adaptively during operation and controlled by the evaluation electronics 3. The longitudinal adjustment of the transducers 7 through 10 may also be performed in predefined discrete steps.

However, the transducers 7 through 10 can also be mounted rotatably in or on the measuring pipe 1 itself and advantageously about an axis oriented normally along the longitudinal axis of the measuring pipe 1 and parallel to the tangent line on the wall of the measuring pipe 1 at the location of the installation of the respective transducers 7 through 10. The phenomenon of the drift of acoustic signals can be acted against with an arrangement of this type and the sound-breaking effects can also be considered.

FIG. 1 shows furthermore schematically the reception electronics 11, which provide amplification and the analog primary processing of the reception signals. It is connected to the evaluation electronics 3, which control the generation of transmission signals as well as the control electronics 4 of the heating element. The evaluation electronics 3 have available additional input signals, which are the result from at least one temperature sensor 12 for the gas temperature and from a temperature sensor 13 for the pipe wall temperature, and advantageously they include advantageously the values from a pressure sensor 14. For the possible consideration of the gas composition, which is also entered into the computation of the gas flow, there can also be provided advantageously a lambda probe 15, which forwards the information about the actual air ratio to the evaluation electronics 3 via a transmission line. As an alternative thereto, the information about the gas composition can be forwarded from an exhaust-gas analyzing device to the evaluation electronics 3 via a data transmission line 16 (illustrated by a dotted line.)

Figure 2:
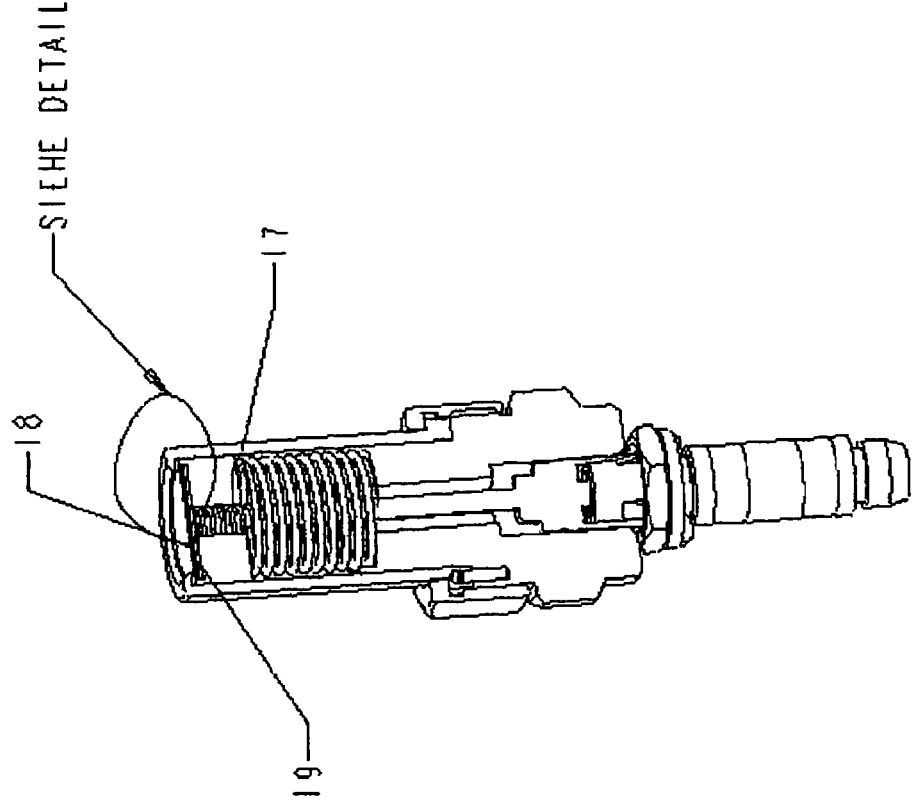

FIG. 2 shows a capacitive ultrasonic transducer according to the invention to be employed in the gas flowmeter arrangement of FIG. 1 while FIG. 2a is a detailed enlargement of the front of the ultrasonic transducer through which the acoustic signal is introduced into the gas. A metallic diaphragm 18 is mounted in a transducer body 17 as an electrode as well as the back plate 19 as a second electrode of the actually active part of the transducer. The texturing of the back plate 19 in the form of uniform ridges 20 can be seen in the detailed view of FIG. 2a whereby said ridges are preferably etched in the insulation layer 21 of the back plate 19 so that a constant distance is ensured between the two electrodes; that is, the diaphragm 18 and the doped back plate 19. The texture 20 was produced after the creation of the insulation layer 21 in case of illustration 2a. The back plate 19 is at first oxidized and the texture is subsequently produced in the insulation layer 21 by caustic etching. However, texturing of the back plate 19 can occur at first and after that the insulation layer 21 may be created. The carrier material is thereby etched at first and subsequently oxidized.

Figure 3:
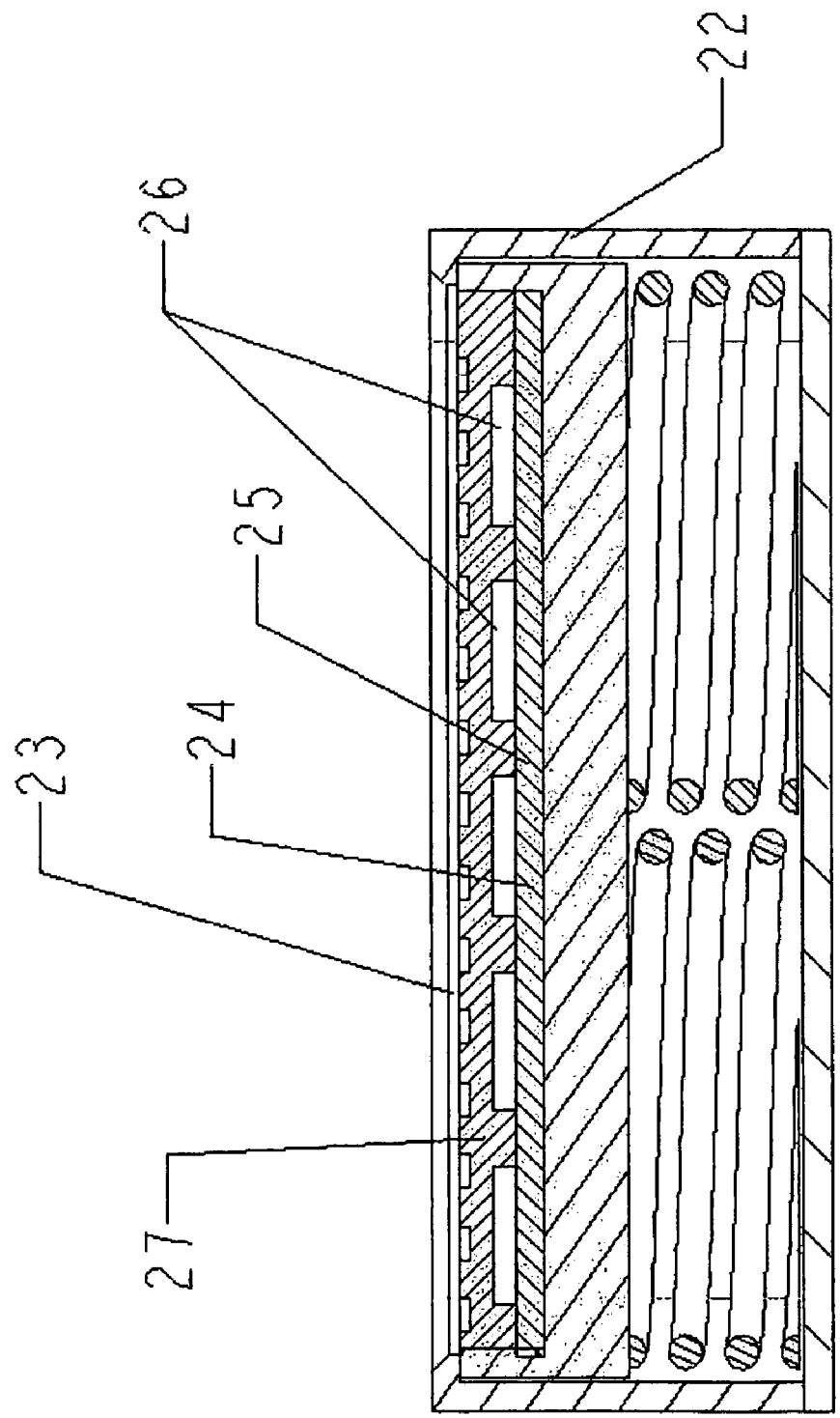
FIG. 3 shows a capacitive ultrasonic transducer in an array design.

FIG. 3 shows the schematic construction of a capacitive array transducer of the invention in a cross-sectional view. The metallic diaphragm 23 and the back plate 24 are mounted in the body 22 of the transducer as a first and second electrode in the same manner as shown in FIG. 2 and FIG. 2a. The back plate 24 is an assembly of the insulating base material 25, the substrate, the insulating layer 27, and the electrodes, which can be controlled individually and which can be individually controlled thereby. The substrate on which the electrodes are vapor-deposited or sputtered, for example, can be made of ceramic, sapphire or $SiO_2$.

A high-temperature stable array transducer, as shown in FIG. 3, has essentially two advantages. Firstly, pockets or recesses in the measuring pipe 1 are no longer necessary because of the flush-mounted installation made possible relative to the inner wall of the pipe, and secondly, the direction of the sound beam cam be simply adjusted during operation for the transmission and reception operation through a corresponding electronic selection of the individual transducer areas and it can be adaptively readjusted to take into consideration the possible drift of the acoustic beam in the gas flow.

Figure 4:
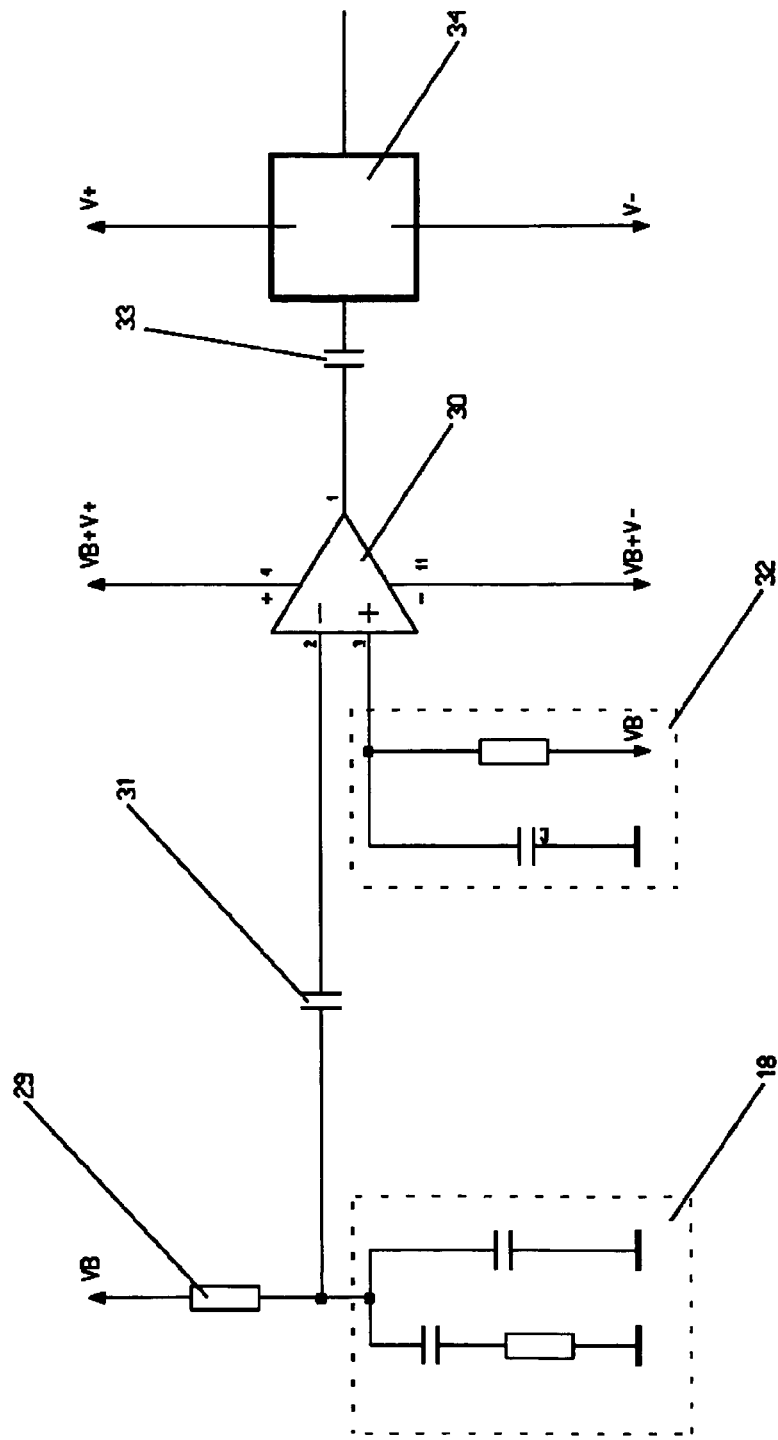
FIG. 4 shows schematically an inventive amplifier circuit for the primary signals of the capacitive sound transducer.

FIG. 4 shows schematically the design of a reception amplifier preferably integrated into the evaluation electronics 3 or interconnected thereto. The auxiliary circuit diagram 28 of the capacitive ultrasonic reception transducer 9 or 10 is illustrated in the drawing with bordering dotted lines. The bias voltage VB is coupled via the coupling resistor 29. The transducer is connected to the following amplifier 30 via a capacitor 31, which serves as protection for the amplifier circuit, i.e. in case of a break in the transducer insulation. The bias voltage VB is also switched to the amplifier at the non-inverting input via an RC element 32. The time constant of the RC element 32 is advantageously equal to the one of the connected ultrasonic transducer to obtain symmetrical conditions at the input of the operational amplifier 30, which means, the resistance of the RC element 32 corresponds to the bias resistance at the inverting input and the capacity of the RC element 32 corresponds to the capacity of the transducer 9 or 10. This has the advantage that low-pass filtering takes place of the interference existing possibly at the desired voltage at equal threshold frequency also at the non-inverting input of the operational amplifier 30, as it is the case for the inverting input through the bias resistance and the capacitive transducer itself.

The supply of the amplifier 30 occurs symmetrically about the bias voltage potential. The reception signal of the ultrasonic reception transducer 9 or 10 is then forwarded for further processing via an additional coupling capacitor 33 and a preferably interconnected filter circuit 34, which no longer lies on the bias voltage potential. A second amplifier can be connected preferably behind the filter circuit 34 to achieve the required total amplification (up to 80 dB). An electrometer amplifier is suitable for this purpose. Setting of the total amplification of the reception electronics (AGC—automatic gain control) is expediently performed in this second step. A change of the amplification in the first step can, in fact, strongly influence the frequency transmission behavior.

Figure 5:
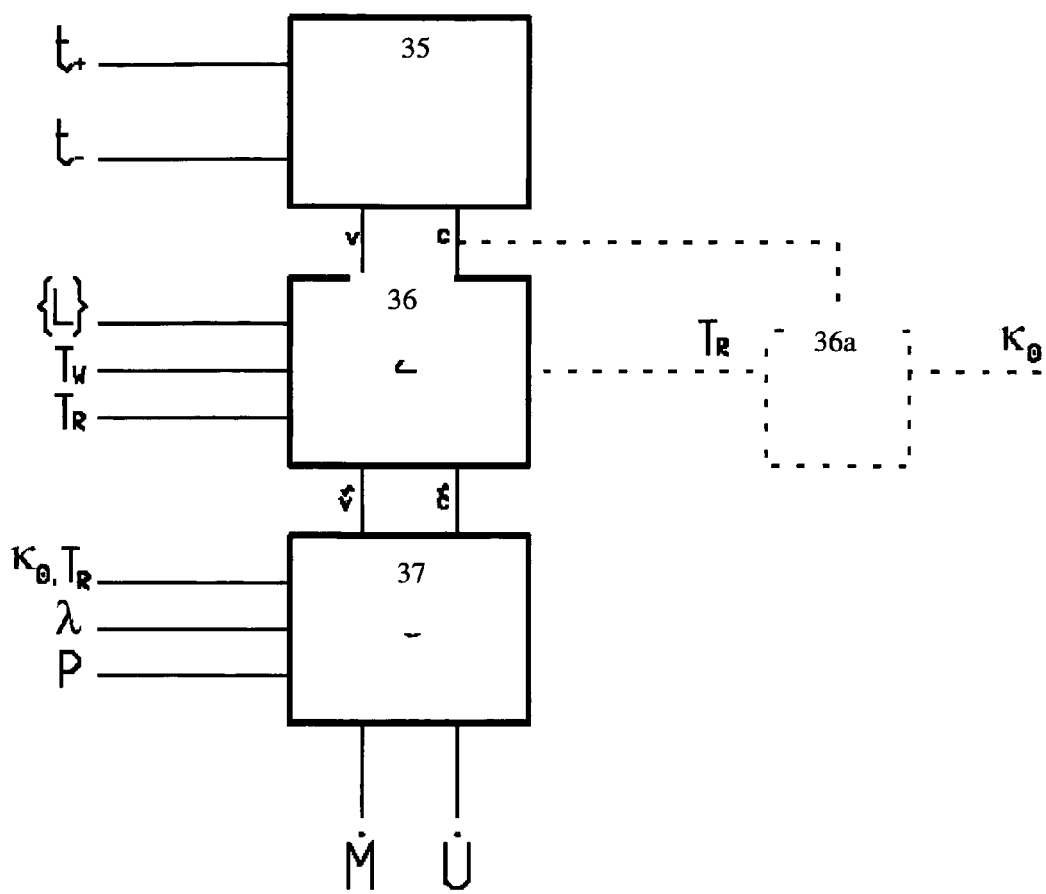
FIG. 5 is an illustration of the evaluation method in form of a block diagram.

FIG. 5 shows schematically the evaluation method according to the invention in a block diagram: In a first step, assessed values for the flow velocity v and the sound velocity c are computed with traditional formulas using the input values t+ and t−, the transit times of the ultrasound in and against the direction of flow of the gas to be measured. In a second step 36, an improved assessment of the values of the flow and sound velocity v and c is determined under consideration of the geometry characteristics symbolized by the input value {L}, and/or the temperature of the wall of the measuring pipe 1 TW and/or characteristic temperature of the gas TG. According to a simple mode, but not the only model for the conditions in the measuring pipe 1, the correction for the assessed value for the flow occurs with the aid of a linear correction factor for the flow velocity, whereby said correction factor depends linear on a standardized temperature difference of the characteristic temperature of the gas and the temperature of the wall of the measuring pipe.

An alternate computation method 36a is illustrated by dotted lines to indicate that the characteristic temperature of the gas can be determined not only by measurement but also from the sound velocity under consideration of the material quantities. In the last step 37, the flowing gas mass M or the flowing gas volume V is determined using the input value κ (kappa), the adiabatic coefficient, possibly again a characteristic temperature TG of the gas, and the air ratio λ (lambda) as well as the actual pressure p.

A plausibility control is advantageously provided about the theoretic mean sound velocity in the measuring pipe 1 in the determination of the gas flow from acoustic transit times. A known relationship between the gas temperature TG and the sound velocity c exists based on the molar mass of the gas, the universal gas constant and the temperature-dependent adiabatic coefficient of the gas, which can be used for a plausibility test. The composition of the gas is determined with the aid of the lambda probe 12 or other analyzers, for example. This is furthermore still needed for the computation of the temperature-dependent adiabatic coefficient κ(T) whose dependency is advantageously not disregarded in the determination of the flowing gas mass M or the gas volume V.

Figure 6:
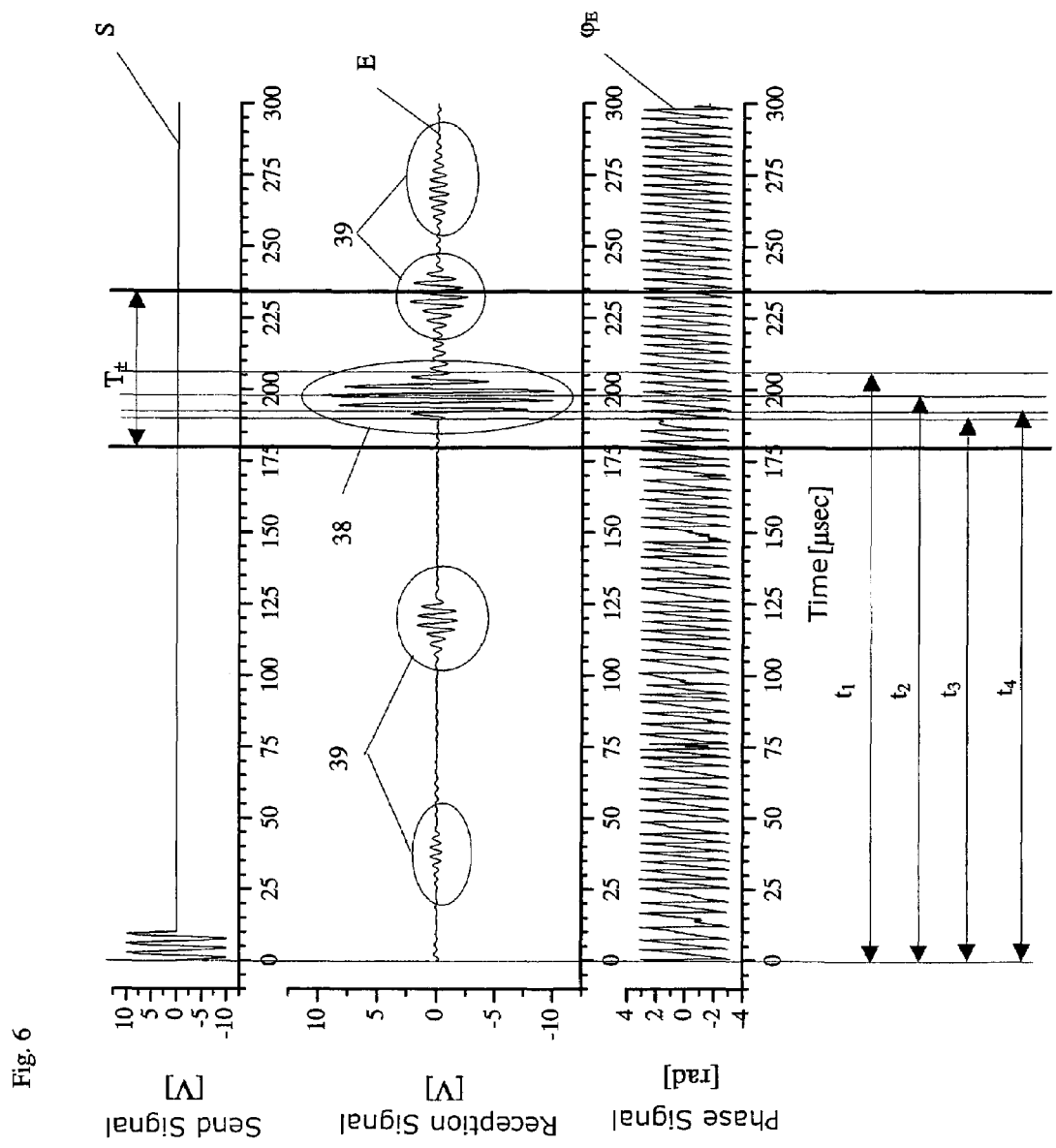
FIG. 6 shows an illustration of the transmission and reception signals of a transmitter and receiver pair as well as the associated phase signal of the reception signal.

The inventive exact detection of the time of arrival of the ultrasonic signals is explained in the following with reference to FIG. 6. Three signals are thereby illustrated in FIG. 6 being on top of one another at the same axis. The transmission S can be seen on the very top, which is shown here in a burst of three wave groups. The actual reception signal E is illustrated in the center of FIG. 6. The useful signal 38 can also be seen, which arrives at the receiver through direct reception of the sound pulse radiated from the transmitter, as well as parasitic reflection signals 39 which are caused by the multiple reflections between the transmitter 7 and 8 and the receiver 9 and 10. They arrive delayed at the receiver depending on the effective sound velocity of the medium after multiple and even-numbered passing of the path of transmitter/receiver. The parasitic reflection signals shown in the drawing originate therefore from transmission pulses, which lie in front of the transmission pulse (burst) shown in the illustration.

The lowest signal φE shows the phase position of the reception signal illustrated complex through Hilbert transformation or similar convolution integral. A continuous change of the phase position can be seen in the areas in which the actual useful signal and the parasitic reflections exist.

The phase begins to turn with a relatively uniform "incline" during the arrival of the pulse at the transducer. This incline depends on the signal frequency of the reception signal. The phase does no longer turn completely about the entire amplitude at the first displacement in the reception signal E since the first displacement forms the transition from phase noise to pulse. The phase transverses the zero line wherever a displacement has reached its maximum. A phase noise can be observed before the pulse arrives.

An expectation time window T± is defined about the assessed value to, which is a first assessed value to for the transit time of the ultrasonic signal. An improved assessed value for the transit time tL is searched for within this time window. The maximal amplitude value of the reception signal E is determined as the improved assessed value t2. From this value, a time t3 is determined in the direction of the transmission time at which the continuous change of the phase position comes to a halt. The time t4 is determined from this new assessed value t3 in the direction of positive time whereby the time t4 determines the first zero passage of the reception signal. This systematic time, which moved by a half period to the actual arrival time of the reception signal, is corrected by computation and used as a transit time for further processing.

As described above, the reception signal is put together by the overlay of useful signals and parasitic reflection signals. The time period between associated reception pulses—which means, between signals originating from the same transmission pulse—is always an even-numbered multiple of the average transit time in and against the direction of flow. However, this mean transit time is mainly determined by the actual sound velocity of the medium and it is determined thereby also by the actual temperature to a great extent.

The temperature of the gas can rapidly fluctuate in large areas in many applications. This leads inevitably to a serious problem in that interfering overlays of useful signals and reflection signals can occur in the domain of the expectation time window, which can make timely and accurate evaluation difficult and which could lead to faulty measurements since the reflected signal is very similar to the actual reception signal relative to the characteristics of such a signal type and phase, for example.

According to the invention, the proposed solution for this problem is to influence the measurement repetition rate so that overlays can be avoided between the reception signal E and the first or second reflection. An optimal measurement repetition rate can be calculated with the aid of an assessed value for the sound velocity whereby the first reflection, and thereby also the second reflection, is placed always behind the actual reception signal having a freely selectable time period in between for safety. This safety period is meaningfully selected as short as possible so that a high measurement repetition rate is made possible and the region in front of the reception signal is kept "clean" relative to second and other additional reflections as well. It is furthermore meaningful to make this safety period dependent on the duration of the transmission signal.

The transmission signals can be advantageously interlaced as long a sufficient time period exists for the reception signal E and the first two reflections until the next reception signal E. The measurement repetition rate can be increased thereby, if necessary.

Should the measurement repetition rate be set adaptively, then the corresponding time markers must be stored together with the computed mass flow values to be able to reconstruct the behavior of the mass flow over time.

The invention claimed is:

1. An ultrasonic gas flowmeter using the transit time process, comprising a measuring pipe with flowing gas, at least one transmitting sound transducer and one receiving sound transducer, as well as transmission and reception electronics, wherein the sound transducers are designed as capacitive ultrasonic transducers for the generation of sound as well as for the reception of time transient sound signals, and devices to level the gas temperature profile of the flow, and to minimize the influence of the temperature profile on the flow measurement.

2. A gas flowmeter according to claim 1, wherein the transducers include a metal diaphragm.

3. A gas flowmeter according to claim 2, wherein the metal diaphragm is placed directly on a second electrode or back plate which consists of a doped semiconductor and an insulating layer superimposed thereon.

4. A gas flowmeter according to claim 3, wherein the insulating layer is made of material that has been created through a reaction of the material of the second electrode or back plate under the influence of heat with the ambient atmosphere during the manufacturing process.

5. A gas flowmeter according to claim 4, wherein the second electrode or back plate is provided with a texture.

6. A gas flowmeter according to claim 5, wherein the second electrode or back plate is provided with a texture made of discrete artificial texture elements.

7. A gas flowmeter according to claim 1, wherein the transducer has a plurality of separate selectable areas in a linear or plane arrangement.

8. A gas flowmeter according to claim 7, wherein at least one sound transducer is movably mounted.

9. A gas flowmeter according to claim 8, wherein at least one tranducer is rotatably mounted.

10. A gas flowmeter according to claim 9, including heating elements for the wall of the measuring pipe.

11. A gas flowmeter according to claim 10, wherein the measuring pipe is manufactured of a material with a low specific heat capacity, and/or is provided with a coating of such material and/or is enclosed with a casing of such material.

12. A gas flowmeter according to claim 11, including temperature- and/or flow profile-forming baffles installed or integrated in the measuring pipe.

13. A gas flowmeter according to claim 12, including at least one temperature sensor to measure the temperature of the wall of the measuring pipe and wherein said sensor is in communication with evaluation electronics.

14. A gas flowmeter according to claim 13, including at least one temperature sensor to measure the temperature of flow and wherein said sensor is in communication with the evaluation electronics.

15. A gas flowmeter according to claim 14, including a device to determine the composition of the gas.

16. A gas flowmeter according to claim 15, including a data line and data interface through which the information about the gas composition of the flow is forwarded.

17. A gas flowmeter according to claim 16, wherein the reception electronics are designed as an analog amplifier and the reference potential of at least the primary amplifier stage is elevated to the potential level of the transducer; which means, to the bias voltage.

18. A gas flowmeter according to claim 17, wherein the inverting input of the amplifier circuit is directly connected to the capacitive transducer.

19. A gas flowmeter according to claim 18, wherein the capacitive transducer and the reference potential is connected to the inverting input of the amplifier circuit via a capacitor.

20. A gas flowmeter according to claim 19, wherein the reference potential is connected also to the non-inverting input of the amplifier circuit via an RC element.

21. A gas flowmeter according to claim 20, wherein the time constant of said RC element is approximately equal to the time constant of the filter formed by the transducer capacity and the coupling resistor of the reference potential.

22. A gas flowmeter according to claim 21, including additional filters connected on the load side to the primary amplifier stage.

23. A device to measure exhaust-gas flows of internal combustion engines, wherein a gas flowmeter is installed in the exhaust train of the internal combustion engine according to claim 1.

24. A device according to claim 23, wherein the gas flowmeter is provided in the vicinity of the possible location of gas sampling for the determination of the pollutant components in the exhaust gas.

25. A device according to claim 24, wherein the gas flowmeter is inserted in pipe sections that contain partial flows of exhaust gas of the internal combustion engine.

26. A device according to claim 24, the gas flowmeter is employed in pipe sections which have a gas flow designed for the dilution of the exhaust gas of the internal combustion engine.

27. A method to determine the flow of gases, whereby the mean flow velocity is determined and whereby the flowing quantity of gas is determined with a highly synchronized resolution from the transit time of the acoustic signals between transmitter and receiver, wherein an assessed value is calculated for the flow after the determination of acoustic transit times and said assessed value is then corrected at least by means of a characteristic temperature of the gas and the temperature in the pipe wall.

28. A method according to claim 27, including using the value of the actual pressure in the measuring pipe to determine the assessed value of the flow.

29. A method according to claim 28, including correcting the assessed value in relationship to the temperature difference of the characteristic temperature of the gas and the temperature of the wall of the measuring pipe.

30. A method according to claim 29, including measuring the temperature of the wall of the measuring pipe.

31. A method according to claim 30, including measuring the temperature of the gas in the measuring pipe.

32. A method according to claim 31, whereby the characteristic temperature of the gas is determined from the transit time and from this value is determined an assessed value for the sound velocity with the aid of a physical model of the temperature profile in the measuring pipe.

33. A method according to claim 32, whereby the characteristic temperature of the gas is precisely defined through consideration of the temperature of the wall of the measuring pipe.

34. A method according to claim 33, whereby the geometry of the arrangement and the flow velocity are taken into consideration during the selection of times for the temperature measurement(s) and the transit time measurements.

35. A method according to claim 34, whereby a nominal value of the adiabatic coefficient is used for the computation of the gas quantity to consider the gas composition during the correction of the assessed value of the gas quantity.

36. A method according to claim 35, including correcting the nominal value of the adiabatic coefficient correspondingly to the characteristic temperature of the gas.

37. A method according to claim 36, including determining an expectation time window for the arrival time of the reception signal depending on the time of transmission and an assessed value for the transit time of the ultrasonic signals.

38. A method according to claim 37, including adapting the sequence of the transmission times, which means the measurement repetition rate, relative to the assessed transit time.

39. A method according to claim 38, including using the transit time of the prior measurement as assessed value for the transit time.

40. A method according to claim 38, including using a computed value derived from a sample value corresponding to the results of a prior flow measurement as assessed value.

41. A method according to claim 40, whereby at first an estimated time for the start of the reception signal is set for the determination of the transit time and the precise start is set through analysis of the phase information of the reception signal represented as a complex value.

42. A method according to claim 41, including determining the complex reception signal through Hilbert transformation of the actual reception signal.

43. A method according to claim 41, including determining the actual phase position of the complex representation of the reception signal for the actual reception signal and the estimated time for the start of the reception signal is set at any desired time in the domain of a continuous change of the phase position.

44. A method according to claim 41, including using the appearance of the maximal amplitude is used for the assessed time of the beginning of the reception signal.

45. A method according to claim 41, including determining the precise start of the reception signal to increase precision with the aid the beginning of a first noisy phase position based on the estimated time for the beginning of the reception signal.

46. A method according to claim 45, whereby the first zero passage of the reception signal is defined as the signal characteristic determining the arrival time.

* * * * *